UnitedStatesPatent [19]

Jenekhe et al.

[11] Patent Number: 5,236,980
[45] Date of Patent: Aug. 17, 1993

US005236980A

[54] POLYAZOMETHINE COMPLEXES AND METHOD FOR MAKING OPTICAL DEVICES AND OTHER MATERIALS THEREWITH

[75] Inventors: Samson A. Jenekhe, Fairport; Chen-Jen Yang, Rochester, both of N.Y.

[73] Assignee: The University of Rochester, Rochester, N.Y.

[21] Appl. No.: 904,759

[22] Filed: Jun. 26, 1992

[51] Int. Cl.$^5$ .............................................. C08G 12/00
[52] U.S. Cl. ..................................... 524/143; 524/145; 524/259; 524/434; 524/437; 524/541; 524/352; 524/924; 528/245; 428/436; 428/364; 428/375; 437/236; 359/130; 427/389.7
[58] Field of Search ............... 524/143, 145, 259, 434, 524/437, 541, 352, 353; 528/245; 428/436, 364, 375; 437/236; 350/96.12; 427/389.7

[56] References Cited

U.S. PATENT DOCUMENTS

| | | | |
|---|---|---|---|
| 4,048,148 | 9/1977 | Morgan | 528/149 |
| 4,122,070 | 10/1978 | Morgan | 528/149 |
| 4,656,240 | 4/1987 | Bossi | 528/529 |

OTHER PUBLICATIONS

Morgan et al., *Macromolecules*, 1987, vol. 20, pp. 729-739.

Wojtkowski, *Macromolecules*, 1987, vol. 20, pp. 740-748.

Jenekhe et al., *Macromolecules*, 1990, vol. 23, pp. 4419-4429.

Yang et al., *Chemistry of Materials*, 1991, vol. 3, pp. 878-887.

Jenekhe et al., *Chemistry of Materials*, 1991, vol. 3, pp. 985-987.

Lee et al., *Makromol. Chem.*, 1989, vol. 190, pp. 1547-1552.

Reinhardt et al., *Polym. Prepr.*, 1990, vol. 31, No. 1, pp. 620-621.

*Primary Examiner*—John Kight, III
*Assistant Examiner*—Rachel Johnson
*Attorney, Agent, or Firm*—M. Lukacher

[57] ABSTRACT

A novel composition is a solution in an organic solvent of an electron donor-acceptor complex of a conjugated aromatic polyazomethine compound and a Lewis acid compound. This composition is coated on a transparent support and the solvent is evaporated to produce an optical device. Decomposition of the polyazomethine-Lewis acid complex coated on the substrate produces a new optical device comprising a film of the polyazomethine compound on the substrate. Compositions of the present invention can also be used for the preparation of optical wave guides, optical switching elements, fibers, and dielectric materials.

31 Claims, No Drawings

POLYAZOMETHINE COMPLEXES AND METHOD FOR MAKING OPTICAL DEVICES AND OTHER MATERIALS THEREWITH

FIELD OF THE INVENTION

This invention relates to polyazomethine complexes and more particularly to the use of solutions of such complexes for the preparation of materials and devices, especially optical devices.

BACKGROUND OF THE INVENTION

Conjugated aromatic polyazomethine compounds have been known for many years, and their properties and methods of preparation have been discussed in a review article (G. F. D'Alelio, *Encycl. Polym. Sci. Technol.*, 1969, Vol. 10, pp. 659-670). Polyazomethines are typically high melting and extremely insoluble in organic solvents; they do dissolve in concentrated sulfuric acid, but solution is accompanied by decomposition.

Morgan et al. (*Macromolecules* 1987, Vol. 20, pp. 729-739) report that melting points of polymeric azomethines can be lowered by unsymmetrical substitution of the aromatic rings, and Wojtkowski (*Macromolecules*, 1987, Vol. 20, pp. 740-748) reports linking the aromatic rings with ether groups to achieve a similar result. These compounds, however, are still insoluble in common organic solvents and in the molten state are susceptible to continuing polymerization.

Introduction of long (8-18 carbon atoms) alkoxy groups into the aromatic nuclei of polyazomethines is reported (K. S. Lee et al., *Makromol. Chem.* 1989, Vol. 190, pp. 1547-1552) to produce polymers that are soluble in various organic solvents. However, another report (B. A. Reinhardt et al. *Polym. Prepr.*, 1990, Vol. 31, No. 1, pp. 620-621) on polymers of similar structure describes them as soluble in methanesulfonic acid but insoluble or partially soluble in ordinary organic solvents.

U.S. Pat. Nos. 4,048,148 and 4,122,070 disclose fibers or films produced from melt-spinnable polymeric azomethine compounds having polymer melt temperatures below 375° C. Because these polymers can continue to polymerize at the high temperatures of the molten state, the use of end-capping or chain-terminating agents is proposed to control the resulting changes in moleculer weight.

The utilization of aromatic polyazomethine compounds as described in the above literature and patents is limited by their high melting points, extremely poor solubility, and instability at high temperatures. The tractability of these compounds is enhanced in accordance with the invention, thereby providing improved compositions and materials that facilitate processing and fabrication of fibers and films and devices utilizing same, especially improved optical, dielectric, and semiconductor materials and devices.

BRIEF SUMMARY OF THE INVENTION

The composition of the present invention comprises a solution in an organic solvent of an electron donor-acceptor, or Lewis acid-base, complex of a conjugated aromatic polyazomethine compound having the general formula

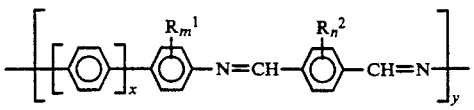

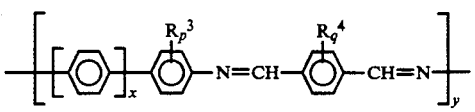

wherein $R^1$, $R^2$, $R^3$, and $R^4$ are independently hydrogen, hydroxy, or alkyl, alkoxy, or aralkyl containing up to 8 carbon atoms, or halogen, including fluorine, chlorine, or bromine; and m, n, p, and q are independently 1, 2, 3, or 4; x is 0 or 1; y and z are each 0 to 1000, and the sum of y and z is 2 to 1000; and a Lewis acid compound.

The composition is coated on an optically transparent substrate and the solvent is evaporated to produce an material providing an optical device. The electron-donor complex of polyazomethine compound and Lewis acid coated on the substrate can be decomposed to produce a new optical device comprising a film of the polyazomethine compound on the transparent substrate.

Compositions of the present invention can also be used for the preparation of fibers, heat resistant materials, and dielectric materials, protective coatings, and optoelectronic materials.

DETAILED DESCRIPTION OF THE INVENTION

Because of the intractability of conjugated aromatic polyazomethine compounds of the literature and patents described above, there is a need to solubilize these compounds, thereby enabling their utilization in the preparation of optical devices and materials, films and fibers, and dielectric and semiconductor materials. In accordance with the present invention, electron donor-acceptor complexes, in which bonds are formed between the imine nitrogen atoms of the polyazomethine compound and a Lewis acid, are prepared. These complexes are soluble in organic solvents. A further advantage of the invention is that the pure polyazomethine compounds can be readily regenerated from the complexes.

Preparation of electron donor-acceptor complexes containing metal halide Lewis acids has been used to solubilize rigid-chain polymers such as poly(benzimidazole-benzophenanthroline) and poly(p-phenylenebenzobisthiazole) in aprotic organic solvents (S. A. Jenekhe and P. O. Johnson, *Macromolecules*, 1990, Vol. 23, pp. 4419-4429). Metal halide Lewis acids include $AlCl_3$, $GaCl_3$, $FeCl_3$, $SbCl_3$, $SbCl_5$, $SbF_5$, $AsF_3$, and $InCl_3$. Aprotic organic solvents that dissolve polymeric electron donor-acceptor complexes include nitrobenzene, nitromethane, nitroethane, 1-nitropropane, and 2-nitropropane. In accordance with the present invention, $GaCl_3$ is a preferred metal halide Lewis acid, and nitromethane is a preferred organic solvent.

The electron donor-acceptor complexes of the invention can also be prepared by the reaction of a conjugated aromatic polyazomethine compound with an organic Lewis acid such as an alkyl or aryl phosphate in an organic solvent. In accordance with the present invention, diphenyl phosphate or di-m-cresyl phosphate are preferred organic Lewis acids, and m-cresol is a preferred organic solvent. The use of these materials individually has been described in C. J. Yang and S. A. Jenekhe, *Chemistry of Materials*, 1991, Vol. 3, pp. 878-887.

Conjugated aromatic polyazomethine compounds can be prepared by the reaction of one or more aromatic diamines with one or more aromatic dialdehydes either in solution or in a molten state, using procedures such as those described in the previously mentioned publications *Encycl. Polym. Sci. Technol.*, 1969, Vol. 10, pp. 659-670; *Macromolecules*, 1987, Vol. 20, pp. 729-739, pp. 740-748; *Polym. Prepr.* 1990, Vol. 31, No. 1, pp. 620-621; and *Chemistry of Materials*, 1991, Vol. 3, pp. 878-887). Preferably, the polymeric compounds are prepared by the reaction of one dialdehyde with an equimolar amount in total of one or two diamines, or of one diamine with an equimolar amount in total of one or two dialdehydes. Where two diamines are employed to prepare a polyazomethine compound, they can be used in equal or unequal molar quantities relative to each other. Similarly, two dialdehydes can be used either in equal or unequal molar amounts. The resulting polymers have intrinsic viscosities [$\eta$], measured in concentrated sulfuric acid at 30° C., of about 0.1 to about 5.0.

Following are examples of preferred conjugated aromatic polyazomethine compounds that can be used in the preparation of compositions of the present invention:

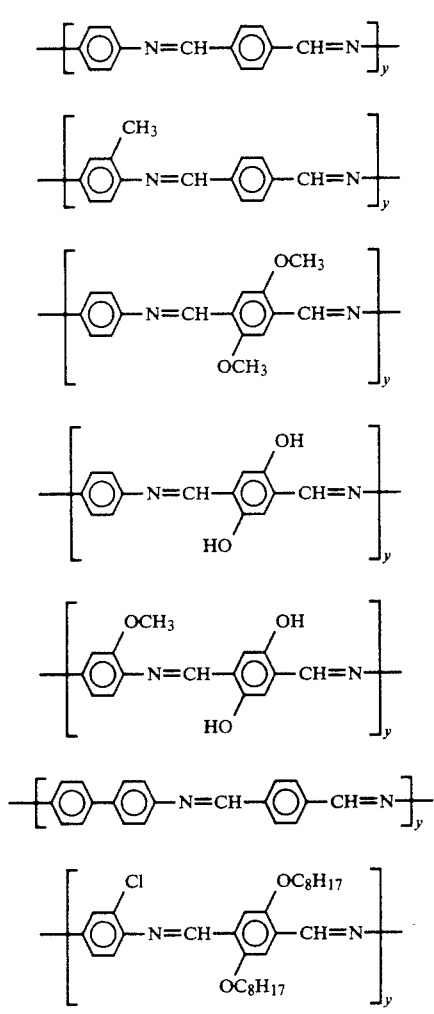

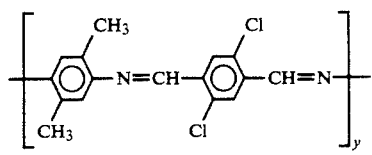

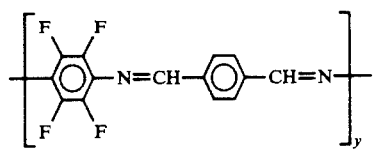

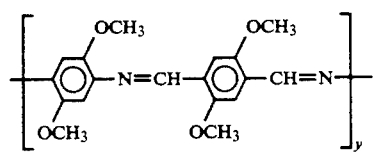

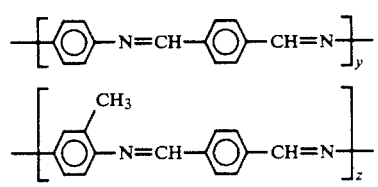

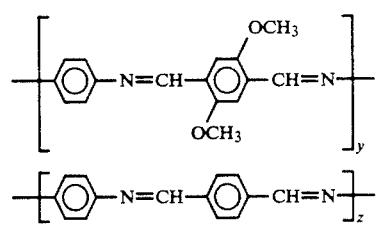

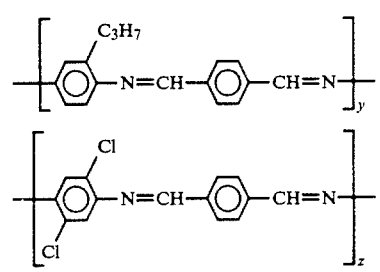

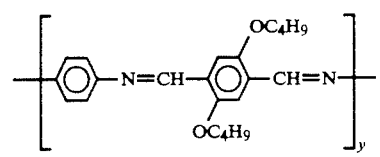

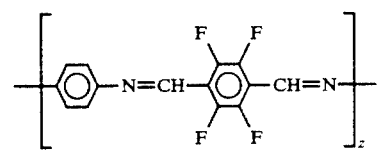

-continued

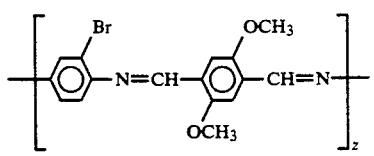

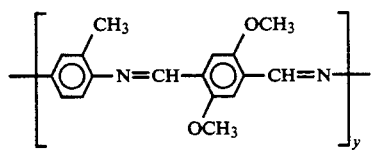
(16)

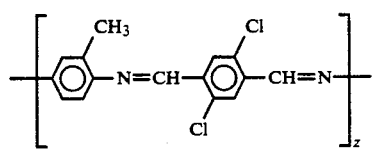

In accordance with the present invention, electron donor-acceptor complexes of conjugated aromatic polyazomethine compounds with metal halide Lewis acids are prepared by mixing the polymer with an aprotic organic solvent such as nitromethane, nitrobenzene, nitroethane, 1-nitropropane, or 2-nitropropane, and adding to the mixture a metal halide, such as $GaCl_3$, $AlCl_3$, $GaCl_3$-$AlCl_3$ mixtures, $FeCl_3$, $BF_3$, or $BCl_3$. In a preferred embodiment, the solvent is nitromethane, and the metal halide is $GaCl_3$. A stoichiometric ratio of at least 1:1 $GaCl_3$/azomethine group is required, but typically a two-fold or greater molar amount of the metal salt is employed. Because of the moisture sensitivity of $GaCl_3$, solutions of the complexes are prepared and stored under moisture free conditions, for example, in a glove box filled with dry nitrogen. Formation of the electron donor-acceptor complex is generally an exothermic process, but the mixture can be stirred and heated at a temperature of 40°-60° C. to accelerate formation and dissolution of the complex.

In another embodiment of the invention, a complex is prepared by adding the polyazomethine compound at room temperature to a vigorously stirred solution of an organic Lewis acid, preferably a diaryl phosphate, in an organic solvent, preferably m-cresol. The stoichiometric ratio of diaryl phosphate to polymer repeating unit can be varied, depending on the desired extent of complex formation. To obtain a 1:1 ratio of dicresyl phosphate to azomethine group in the product, a molar ratio of 2:1 dicresyl phosphate/polymer repeating unit is typically employed. Complete solution in the reaction mixture is generally achieved in about 20 minutes.

Solutions of the complexes of the aromatic polyazomethine compounds with Lewis acids can be coated as thin films on transparent substrates such as optically flat fused silica or glass, using methods such as solution casting or spin coating. Complexes prepared from di-m-cresyl phosphate are applied to the substrates by solution casting, using solutions containing from about 0.5 to about 10 weight percent, preferably about 1 to 2 weight percent, of the polymeric complex in cresol. The coatings are dried in a vacuum oven at a temperature of about 70° to about 130° C. for about 6 to 16 hours to evaporate the solvent.

Solutions of the electron donor-acceptor complexes of the polyazomethine compounds with $GaCl_3$ can be coated as thin films on the substrates either by solution coating in a glove box filled with dry nitrogen or by spin coating. The solutions, preferably in nitromethane as solvent, contain from about 0.5 to about 10 weight percent, preferably about 1 to 2 weight percent, of polymer together with $GaCl_3$ in a molar ratio of approximately 2:1 of azomethine group. Spin coating is typically carried out at a speed of 1000 rpm for 30 to 90 seconds. The coatings are dried in a vacuum oven at a temperature of about 35° to about 75° C. for about 1 to 12 hours to evaporate the solvent.

The electron donor-acceptor complexes of the aromatic polyazomethine compounds with Lewis acids in coated thin films can be decomposed to produce films of the uncomplexed azomethine polymers by reactive contact with a low molecular weight alcohol or with a mixture of such alcohol and a low molecular weight amine or with water. Typically, a complex from di-m-cresyl phosphate coated on a substrate is placed in a mixture of ethanol and triethylamine for several hours at room temperature to produce a film of pure polyazomethine compound on the substrate. A coating of a complex from $GaCl_3$ is immersed in methanol at room temperature for a few hours to two days to decompose the complex and produce a film coating of pure polyazomethine compound.

The films of both the polymeric azomethine compounds and their complexes with inorganic and organic Lewis acids coated on optically transparent substrates comprise novel third-order nonlinear optical devices. The polyazomethine compositions of the invention are also processable into optical waveguides, optical switching elements, dielectric materials, and protective coatings.

Characterization of Polyazomethine Compounds and Lewis Acid Complexes $^1H$ NMR spectra at 300 MHz of 1.5 weight percent solutions of the polyazomethine compounds in deuterated nitromethane containing about 1.5-1.9 weight percent of $GaCl_3$ were taken, using a General Electric Model QE300 instrument.

Fourier transform infrared (FTIR) spectra were taken at room temperature with a Nicolet Model 20 SXC spectrometer under nitrogen purge. Samples were in the form of KBr pellets or films coated on NaCl disks.

Electronic spectra were obtained with a Perkin-Elmer Lambda 9 spectrophotometer.

Thermogravimetric analysis (TGA) and differential scanning calorimetry (DSC) were done using a DuPont Model 2100 thermal analyst based on an IBM PS/2 Model 60 computer and equipped with a Model 951 TGA unit and a Model 910 DSC unit. TGA data were obtained in flowing nitrogen at a heating rate of 10° C./min. DSC thermograms were obtained in nitrogen at a heating rate of 20° C./min.

Intrinsic viscosities $[\eta]$ of the polyazomethine compounds in concentrated sulfuric acid and in nitromethane containing 2:1 $GaCl_3$/azomethine group were measured, using a Cannon-Ubbelhode capillary viscometer and a constant temperature bath at 30°±0.1° C. The intrinsic viscosity values were obtained from the intersection of plots of the reduced viscosity ($\eta_{sp}/c$) and inherent viscosity ($\eta_{inh}=[\ln \eta_{rel}]/c$) versus concentration.

The following examples further illustrate the invention.

EXAMPLE 1

Preparation and Characterization of Polyazomethine Compound (1)

Compound (1) was prepared by a published procedure (P. W. Morgan, et al., *Macromolecules*, 1987, Vol. 20, pp. 729-739). The polymer was precipitated out of the reaction medium (1:1 hexamethylenephosphoramide/1-methyl-2-pyrrolidinone) after 20 hours reaction time by pouring into methanol. The product was washed with water and methanol and further purified by overnight extraction with refluxing methanol in a Soxhlet apparatus. Compound (1) was obtained as a yellow powder. Its $^1$H NMR spectrum in GaCl$_3$/CD$_3$NO$_2$ showed chemical shifts at 8.30, 8.70, and 9.86 ppm, which is consistent with the proposed structure. Its FTIR spectrum had peaks at 1610 (C=N stretch) and 850 (out-of-plane C-H bend) cm$^{-1}$.

The electronic absorption spectrum of compound (1) in concentrated sulfuric acid solution had a $\lambda_{max}$ at 453 nm (log $\epsilon$4.24). The spectrum of a solution of its 1:1 complex with di-m-cresyl phosphate in m-cresol had a $\lambda_{max}$ at 502 nm.

The onset of thermal decomposition of compound (1) was determined to be 504° C. by TGA. The DSC thermogram showed a crystalline melting peak at 385° C.

The intrinsic viscosity for compound (1) was determined to be 0.84 dL/g in 96% sulfuric acid and 1.38 dL/g in GaCl$_3$/CH$_3$NO$_2$.

EXAMPLE 2

Preparation and Characterization of Polyazomethine Compound (2)

Compound (2) was prepared and purified by the same procedures used for compound (1) of Example 1. Compound (2) was obtained as a yellow powder. Its $^1$H NMR spectrum in GaCl$_3$/CD$_3$NO$_2$ showed chemical shifts at 2.80, 8.10, 8.70, 9.66, and 9.80 ppm, which is consistent with the proposed structure. Its FTIR spectrum had peaks at 1615 (C=N stretch) and 830 (out-of-plane C-H bend) cm$^{-1}$.

The electronic absorption spectrum of compound (2) in concentrated sulfuric acid solution had a $\lambda_{max}$ at 438 nm (log $\epsilon$4.22).

The spectrum of a solution of its 1:1 complex with di-m-cresyl phosphate in m-cresol had a $\lambda_{max}$ at 496 nm.

The DSC thermogram of compound (2) showed two endothermic peaks at 208° C. and 222° C.

The intrinsic viscosity for compound (2) was determined to be 0.70 dL/g in 96% sulfuric acid and 1.35 dL/g in GaCl$_3$/CH$_3$NO$_2$.

EXAMPLE 3

Preparation and Characterization of Polyazomethine Compound (3)

The 2,5-dimethoxyterephthaldehyde required as starting material for compound (3) was prepared by a sequence of three published procedures (F. R. Diaz, et al., *J. Polym. Sci.: Polym. Chem. Ed.*, 1985, Vol. 23, pp. 2757-2765; J. H. Wood, et al., *J. Am. Chem. Soc.*, 1949, Vol. 71, p. 393; 1950, Vol. 72, p. 2992).

A mixture of 2.5724 g (13.26 mmol) of 2,5-dimethoxyterephthaldehyde and 1.4339 g (13.26 mmol) of 1,4-phenylenediamine in 40 ml of 1:1 hexamethylenephosphoramide and 1-methyl-2-pyrrolidinone containing 0.8 g of LiCl was reacted under nitrogen purge at room temperature for 48 hours. The reaction mixture was poured into methanol, and the precipitated polymer was washed with water and methanol and dried under vacuum. Compound (3) was obtained as an orange powder (3.25 g, 92% yield).

The $^1$H NMR spectrum of compound (3) in GaCl$_3$/CD$_3$NO$_2$ showed chemical shifts at 4.50, 8.20, and 9.60 ppm, which is consistent with the proposed structure. Its FTIR spectrum had peaks at 1605 (C=N stretch), 840 (out-of-plane C-H stretch), and 1210 (C-O-C stretch) cm$^{-1}$.

The electronic absorption spectrum of compound (3) in concentrated sulfuric acid solution had $\lambda_{max}$s at 415 nm (log $\epsilon$3.98) and at 565 nm (log $\epsilon$3.98). The spectrum of a solution of its 1:1 complex with di-m-cresyl phosphate in m-cresol had a $\lambda_{max}$ at 523 nm.

The onset of thermal decomposition of compound (3) was determined to be 386° C. by TGA. The DSC thermogram of compound (3) showed no crystalline melting or glass transition temperature before decomposition.

The intrinsic viscosity for compound (3) was determined to be 0.19 dL/g in 96% sulfuric acid and 1.04 dL/g in GaCl$_3$/CH$_3$NO$_2$.

EXAMPLE 4

Preparation and Characterization of Polyazomethine Compound (4)

2,5-Dihydroxyterephthaldehyde was prepared by the reaction of 2,5-dimethoxyterephthaldehyde, used in Example 3, with a mixture of acetic acid and hydrobromic acid, following published procedures (D. E. Burton, et al., *J. Chem. Soc.* 1965, p. 438; J. N. Marx, et al., *J. Heterocycl. Chem.*, 1975, Vol. 12, p. 417). The product was purified by extraction overnight with benzene in a Soxhlet apparatus.

Compound (4) was prepared from 0.46 g (2.77 mmol) of 2,5-dihydroxyterephthaldehyde and 0.3 g (2.77 mmol) of 1,4-phenylenediamine, following the procedure of Example 3. After 72 hr reaction time the mixture was poured into methanol, and the polymer was purified as described in Example 1. After drying, 0.63 g (95% yield) of compound (4) was obtained as a red powder.

The $^1$H NMR spectrum of compound (4) in GaCl$_3$/CD$_3$NO$_2$ showed chemical shifts at 6.40, 8.20, 8.40, and 9.60 ppm, which is consistent with the proposed structure. Its FTIR spectrum had peaks at 1600 (C=N stretch), 840–870 (out-of-plane C-H bend), and 3380 (O-H stretch) cm$^{-1}$.

The electronic absorption spectrum of compound (4) in concentrated sulfuric acid solution had $\lambda_{max}$s at 420 nm (log $\epsilon$4.30) and at 554 nm (log $\epsilon$4.30).

The DSC thermogram of compound (4) showed no crystalline melting or glass transition temperature before decomposition.

The intrinsic viscosity for compound (4) was determined to be 0.34 dL/g in 96% sulfuric acid and 1.14 dL/g in GaCl$_3$/CH$_3$NO$_2$.

EXAMPLE 5

Preparation and Characterization of Polyazomethine Compound (5)

Compound (5) was prepared from 0.404 g (2.43 mmol) of 2,5-dihydroxyterephthaldehyde and 0.336 g (2.43 mmol) of 2-methoxy-1,4-phenylenediamine in 10 ml of 1:1 hexamethylenephosphoramide: 1-methyl-2-pyrrolidinone containing 0.73 g of LiCl, following the procedure of Example 3. There was obtained 0.56 g (86% yield) of compound (5) as a red powder.

The $^1$H NMR spectrum of compound (5) in GaCl$_3$/CD$_3$NO$_2$ showed chemical shifts at 6.10, 7.80, 8.30, and 9.50 ppm, which is consistent with the proposed structure. Its FTIR spectrum had peaks at 1600 (C=N stretch) and 800-870 (out-of-plane C-H bend) cm$^{-1}$.

The electronic absorption spectrum of compound (5) in concentrated sulfuric acid had a $\lambda_{max}$ at 602 nm (log $\epsilon$4.23).

The onset of thermal decomposition of compound (5) was determined to be 369° C. by TGA. The DSC thermogram showed no crystalline melting peak before decomposition.

The intrinsic viscosity for compound (5) was determined to be 0.77 dL/g in GaCl$_3$/CH$_3$NO$_2$.

EXAMPLE 6

Preparation and Characterization of Polyazomethine Compound (6)

Compound (6) was prepared from 1.25 g (9.18 mmol) of terephthaldehyde and 1.69 g (9.18 mmol) of benzidine in 30 ml of 1:1 hexamethylenephosphoramide: pyrrolidinone containing 0.18 g of LiCl, following the procedure of Example 3. The product was obtained as a yellow powder, weight 2.50 g (96% yield).

The $^1$H NMR spectrum of compound (6) in GaCl$_3$/CD$_3$NO$_2$ showed chemical shifts at 8.20, 8.65, and 9.80 ppm, consistent with the proposed structure. Its FTIR spectrum had peaks at 1620 (C=N stretch) and 840 (out-of-plane C-H bend) cm$^{-1}$.

The electronic absorption spectrum of compound (6) in concentrated sulfuric acid had a $\lambda_{max}$ at 491 nm (log $\epsilon$4.26).

The onset of thermal decomposition of compound (6) was determined to be 527° C. by TGA. The DSC thermogram showed a melting peak at 454° C.

The intrinsic viscosity for compound (6) was determined to be 1.74 dL/g in GaCl$_3$/CH$_3$NO$_2$.

EXAMPLE 7

Preparation and Characterization of Polyazomethine Compound (11)

Compound (11) was prepared by solution polymerization at room temperature under nitrogen of 1.0677 g (8.74 mmol) of 2-methyl-1,4-phenylenediamine, 0.9453 g (8.74 mmol) of 1,4-phenylenediamine, and 2.3450 g (17.48 mmol) of terephthaldehyde in 50 ml 1:1 hexamethylenephosphoramide and 1-methyl-2-pyrrolidinone containing 1 g of LiCl. The polymer was isolated and purified as in Example 1. After drying under vacuum, 3.647 g (98% yield) of compound (11) was obtained.

The $^1$H NMR spectrum of compound (11) in GaCl$_3$/CD$_3$NO$_2$ showed chemical shifts at 2.80, 8.10, 8.30, 8.70, 9.70, and 9.83 ppm, which is consistent with the proposed structure. The composition of compound (11) was determined from its $^1$H NMR spectrum by comparing the ratios of azomethine protons to methyl protons (from 2-methyl-1,4-phenylenediamine) and to p-phenylene protons. Those ratios were determined to be 0.52 and 0.54, respectively, which showed that the actual composition of compound (11) was very close to that expected from the starting 50:50 mixture of diamines.

The FTIR spectrum of compound (11) had peaks at 1615 (C=N stretch) and 845 (out-of-plane C-H stretch) cm$^{-1}$.

The electronic absorption spectrum of compound (11) in concentrated sulfuric acid solution had a $\lambda_{max}$ at 448 nm (log $\epsilon$4.23). The spectrum of a solution of its 1:1 complex with di-m-cresyl phosphate in m-cresol had a $\lambda_{max}$ at 499 nm.

The DSC thermogram of compound (11) showed a crystalline melting peak at 281° C.

The intrinsic viscosity for compound (11) was determined to be 0.82 dL/g in 96% sulfuric acid and 1.36 dL/g in GaCl$_3$/CH$_3$NO$_2$.

EXAMPLE 8

Preparation of Complexes and Optical Film Coatings from Polyazomethine Compound (1)

Compound (1) was added with vigorous stirring to a solution of di-m-cresyl phosphate (DCP) in m-cresol. The resulting mixture contained 1.5 weight percent of compound (1) and 1:1 molar ratio of DCP to azomethine group. Complete solution was achieved in about 20 minutes.

The solution of the DCP complex of compound (1) in m-cresol was solution cast onto an optically flat fused silica substrate (5 cm in diameter). The coating was dried in a vacuum oven at 100° C. overnight to evaporate the cresol. The electronic absorption spectrum of the film of the complex of compound (1) with DCP had a $\lambda_{max}$ of 490 nm. This coating was placed in a mixture of ethanol and triethylamine overnight to decompose the complex. The coating was dried, producing a thin film of polyazomethine compound (1). The electronic absorption spectrum of this film had a $\lambda_{max}$ of 405 nm, an optical absorption edge of 496 nm, and a bandgap of 2.50 eV. FTIR and TGA analyses confirmed that the pure polyazomethine compound had been completely regenerated from the complex.

In a glove box filled with dry nitrogen, compound (1) was added to a stirred solution of GaCl$_3$ in nitromethane. The resulting mixture contained 1.0 weight percent of compound (1) and a 2:1 molar ratio of GaCl$_3$ to azomethine group. Complete dissolution was achieved in about 24 hours at room temperature.

The solution of the GaCl$_3$ complex of compound (1) was solution cast onto an optically flat fused silica substrate (5 cm in diameter) in a glove box. Alternatively, the solution could be spin coated at 1000 rpm for 30 seconds. The coating was dried in a vacuum oven at 50° C. to evaporate the nitromethane. The electronic absorption spectrum of the film of the complex of compound (1) with GaCl$_3$ had a $\lambda_{max}$ of 440 nm. This coating was immersed in methanol for 1-2 days to decompose the complex. There was thus produced a thin film of polyazomethine compound (1), which had been previously produced by decomposition of the DCP complex. FTIR and TGA analyses confirmed that the pure polyazomethine compound had been regenerated from its GaCl$_3$ complex.

EXAMPLE 9

Preparation of Complexes and Optical Film Coatings from Polyazomethane Compound (2)

The DCP and GaCl$_3$ complexes of compound (2) and their respective coatings were prepared by the procedures of Example 8. The observed $\lambda_{max}$ values from the electronic absorption spectra of the films of the DCP and GaCl$_3$ complexes were 495 nm and 441 nm, respectively.

Films of pure compound (2) were obtained by decomposition of its complexes, using the procedures described in Example 8. The electronic absorption spectrum of the film of compound (2) had a $\lambda_{max}$ of 406 nm, an optical absorption edge of 497 nm, and a bandgap of 2.49 eV. FTIR and TGA analyses confirmed that the pure polyazomethine compound had been regenerated from its complexes.

EXAMPLE 10

Preparation of Complexes and Optical Film Coatings from Polyazomethine Compound (3)

The DCP and GaCl$_3$ complexes of compound (3) and their respective coatings were prepared by the procedures described in Example 8. The observed $\lambda_{max}$ values from the electron absorption spectra of the films of the DCP and GaCl$_3$ complexes were 560 nm and 505 nm, respectively.

Films of pure compound (3) were obtained by decomposition of its complexes, using the procedures of Example 8. The electronic absorption spectrum of the film of compound (3) had a $\lambda_{max}$ of 447 nm, an optical absorption edge of 529 nm, and a bandgap of 2.34 eV. FTIR and TGA analyses confirmed that the pure polyazomethine compound had been generated from its complexes.

EXAMPLE 11

Preparation of GaCl$_3$ complex and optical film coatings from polyazomethine compound (4)

The GaCl$_3$ complex of compound (4) was prepared and coated by the procedure described in Example 8. The electronic absorption spectrum of the film had a $\lambda_{max}$ of 568 nm.

The DCP complex of compound (4) could not be prepared, possibly because of intramolecular hydrogen bonding between the hydroxy substituents and the azomethine groups.

A film of pure compound (4) was obtained by decomposition of its GaCl$_3$ complex, following the procedure of Example 8. The electronic absorption spectrum of the film of compound (4) had a $\lambda_{max}$ of 494 nm, an optical absorption edge of 600 nm, and a bandgap of 2.07 eV. FTIR and TGA analyses confirmed that the pure polyazomethine compound had been generated from its complexes.

EXAMPLE 12

Preparation of GaCl$_3$ Complex and Optical Film Coatings from Polyazomethine Compound (5)

The GaCl$_3$ complex of compound (5) was prepared and coated, following the procedure described in Example 8. The electronic absorption spectrum of the film had a $\lambda_{max}$ of 585 nm and a bandgap of 1.72 eV.

A film of pure compound (5) was obtained by decomposition of its complex, using the procedure of Example 8. The electronic absorption spectrum of the film of compound (5) had a $\lambda_{max}$ of 510 nm and a bandgap of 2.03 eV. FTIR and TGA analyses confirmed that the pure polyazomethine compound had been generated from its complex.

EXAMPLE 13

Preparation of GaCl$_3$ Complex and Optical Film Coatings from Polyazomethine Compound (6)

The GaCl$_3$ complex of compound (6) was prepared and coated by the procedure described in Example 8. The electronic absorption spectrum of the film had a $\lambda_{max}$ of 490 nm and a bandgap of 2.07 eV.

A film of compound (6) was obtained by decomposition of its complex, following the procedure of Example 8. The electronic absorption spectrum of the film of compound (6) had a $\lambda_{max}$ of 420 nm and a bandgap of 2.53 eV. FTIR and TGA analyses confirmed the regeneration of pure compound (6) from its complex.

EXAMPLE 14

Preparation of Complexes and Optical Film Coatings from Polyazomethine Compound (11)

The DCP and GaCl$_3$ complexes of compound (11) and their respective coatings were prepared by the procedures of Example 8. The observed $\lambda_{max}$ values from the electronic absorption spectrum of the DCP and GaCl$_3$ complexes were 496 nm and 440 nm, respectively.

Films of pure compound (11) were obtained by decomposition of its complexes, using the procedures of Example 8. The electronic absorption spectrum of the coating of compound (11) had a $\lambda_{max}$ of 407 nm, an optical absorption band edge of 497 nm, and a bandgap of 2.49 eV. FTIR and TGA analyses confirmed that the pure polyazomethine compound had been generated from its complexes.

EXAMPLE 15

Measurement of Third-Order Nonlinear Optical Susceptibility of Film of Compound (1)

Third-order harmonic generation measurements of the magnitude of $\chi^{(3)}$ ($-3\omega; \omega, \omega, \omega$) were made on a film of compound (1) on fused silica, which was prepared as described in Example 8. A picosecond laser system continuously tunable in the range of 0.6–4.0 $\mu$m was employed for the measurements, using a published procedure (S. A. Jenekhe, et al., *Chem. Mater.*, 1991, Vol. 3, pp. 985–987; H. Vanherzeele, et al., *Appl. Phys. Lett.*, 1991, Vol. 58, pp. 663–665; J. A. Osaheni, et al., *Chem. Mater.*, 1991, Vol. 3, pp. 218–221). The 102 $^{(3)}$ values, which were measured over the range of 0.9–2.4 $\mu$m, are average values, corrected for absorption at the third harmonic wave length and determined relative to the $\chi^{(3)}$ for fused silica (2.8 × 10$^{-14}$ esu at 1.9 $\mu$m). The reported $\chi^{(3)}$ values have an error of 20%, mostly because of error in measurement of film thickness. Individual results are repeatable within ±5%.

The $\chi^{(3)}$ ($-3\omega; \omega,\omega,\omega$) spectrum of the film of compound (1) showed a nonresonant $\chi^{(3)}$ value of 1.6 × 10$^{-12}$ esu at 2.4 $\mu$m. There was a three-photon resonant peak at 1.2 $\mu$m, corresponding to an $\chi^{(3)}$ value of 16 × 10$^{-12}$ esu. Thus, there was a resonance-enhanced 10-fold increase in optical nonlinearity compared to the off-resonance value.

EXAMPLE 16

Measurement of Third-Order Nonlinear Optical Susceptibility of Film of Compound (3)

Third-order harmonic generation measurements were made as described in Example 15 on a film of compound (3) on fused silica, which was prepared as described in Example 10.

The $\chi^{(3)}$ ($-3\omega$; $\omega,\omega,\omega$) spectrum of the film of compound (3) showed a nonresonant $\chi^{(3)}$ value of $7.3 \times 10^{-12}$ esu at 2.4 $\mu$m and a three-photon resonant peak at 1.35 $\mu$m, which corresponded to an $\chi^{(3)}$ value of $54 \times 10^{-12}$ esu. There was thus a resonance-enhanced increase of more than 7-fold in third-order nonlinear optical susceptibility over that measured off-resonance.

EXAMPLE 17

Measurement of Third-Order Nonlinear Optical Susceptibility of Films of Compound (5) and its GaCl$_3$ Complex Third-order harmonic generation measurements were made as described in Example 15 on a film of compound (5) on fused silica, prepared as described in Example 12.

The $\chi^{(3)}$ ($-3\omega$; $\omega,\omega,\omega$) spectrum of the film of compound (5) showed a nonresonant $\chi^{(3)}$ value of $16.3 \times 10^{-12}$ esu at 2.38 $\mu$m and a resonant $\chi^{(3)}$ value of $72 \times 10^{-12}$ esu, a resonance-enhanced 4.4-fold increase in optical nonlinearity compared to the off-resonance value.

Third-order harmonic generation measurements were also made on the film on fused silica of the GaCl$_3$ complex of compound (5), whose preparation was described in Example 12.

The measured nonresonant $\chi^{(3)}$ value for the film of the compound (5)-GaCl$_3$ complex was $20.8 \times 10^{-12}$ esu at 2.38 $\mu$m, and the resonant $\chi^{(3)}$ value was $53 \times 10^{-12}$ esu, a resonance-enhanced increase of 2.5-fold in optical nonlinearity compared to the off-resonance value.

Thus, films of both the pure polyazomethine compound (5) and its GaCl$_3$ complex exhibit third-order nonlinear optical properties.

EXAMPLE 18

Measurement of Third-Order Nonlinear Optical Susceptibility of Films of Compound (6) and its GaCl$_3$ Complex Third-order harmonic generation measurements were carried out as described in Example 15 on a film of compound (6) on fused silica, prepared as described in Example 13.

The nonresonant $\chi^{(3)}$ value measured at 2.38 $\mu$m for compound (6) was $5.2 \times 10^{-12}$ esu, and the resonant $\chi^{(3)}$ value was $32 \times 10^{-12}$ esu, a greater than 6-fold enhancement in optical nonlinearity relative to the off-resonance value.

The nonresonant $\chi^{(3)}$ value measured at 2.38 $\mu$m for the film of the GaCl$_3$ complex of compound (6) was $6.3 \times 10^{-12}$ esu. Its resonant $\chi^{(3)}$ value was $26 \times 10^{-12}$ esu, which represents a greater than 4-fold enhancement in optical nonlinearity compared to the off-resonance value.

Thus, third-order nonlinear optical susceptibility was observed both for compound (6) and its GaCl$_3$ complex.

EXAMPLE 19

Measurement of Third-Order Nonlinear Optical Susceptibility of Film of Compound (11)

Third-order harmonic generation measurements were made as described in Example 15 on a film of compound (11) on fused silica, prepared as described in Example 14.

The measured nonresonant $\chi^{(3)}$ value for the film of compound (11) was $2.3 \times 10^{-12}$ esu at 2.38 $\mu$m, and the resonant $\chi^{(3)}$ value was $19 \times 10^{-12}$ esu, a resonance-enhanced 8-fold increase in optical nonlinearity compared to the off-resonance value.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A composition comprising a solution in an organic solvent of an electron donor-acceptor complex of a conjugated aromatic polyazomethine compound comprised of the repeating units

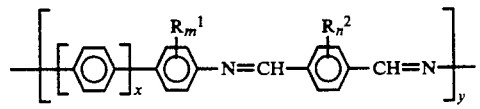

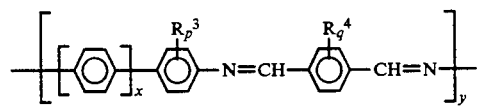

wherein $R^1$, $R^2$, $R^3$, and $R^4$ are independently hydrogen, hydroxy, or alkyl, alkoxy, or aralkyl groups containing up to 8 carbon atoms, or halogen, including fluorine, chlorine, or bromine; m,n,p, and q are independently 1,2,3, or 4; x is 0 or 1; y and z are each 0 to 1000, and the sum of y and z is 2 to 1000; and a Lewis acid compound.

2. A composition of claim 1 wherein y and z are each 0 to 500, and the sum of y and z is 10 to 500.

3. A composition of claim 1 wherein $R^1$, $R^2$ $R^3$, and $R^4$ are hydrogen.

4. A composition of Claim 1 wherein $R^1$ and $R^3$ are methoxy.

5. A composition of claim 1 wherein said Lewis acid compound is a metal halide.

6. A composition of claim 5 wherein said metal halide is GaCl$_3$, AlCl$_3$, or mixtures thereof.

7. A composition of claim 1 wherein said Lewis acid compound is an alkyl or aryl phosphate.

8. A composition of claim 7 wherein said phosphate is diphenyl phosphate or di-m-cresyl phosphate.

9. A composition of claim 1 wherein said solvent is nitromethane, nitroethane, or nitrobenzene.

10. A composition of claim 1 wherein said solvent is cresol.

11. The method of preparing an optical device comprising the steps of
(a) applying to an optically transparent substrate a solution in an organic solvent of an electron donor-acceptor complex of a conjugated aromatic polyazomethine compound comprised of the repeating units

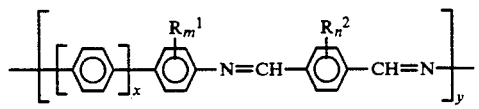

-continued

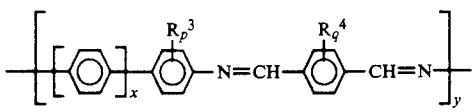

wherein $R^1$, $R^2$, $R^3$, and $R^4$ are independently hydrogen, hydroxy, or alkyl, alkoxy, or aralkyl containing up to 8 carbon atoms, or halogen, including fluorine, chlorine, or bromine; m, n, p, and q are independently 1, 2, 3, or 4; x is 0 or 1; y and z are each 0 to 1000, and the sum of y and z is 2 to 1000; and a Lewis acid compound; and (b) evaporating said solvent, producing a film of said complex on said substrate.

12. The method of claim 11 wherein said film of said complex on said substrate provides a third-order nonlinear optical device.

13. The method of claim 11 comprising an additional step (c) decomposing said complex on said substrate, producing a film of said polyazomethine compound on said substrate.

14. The method of claim 13 wherein said film of said polyazomethine compound on said substrate provides a third-order nonlinear optical device.

15. The method of claim 11 wherein said Lewis acid compound is a metal halide or an alkyl or aryl phosphate.

16. The method of claim 11 wherein said solvent is nitromethane or m-cresol.

17. The method of claim 11 wherein said substrate is glass or fused silica.

18. The method of claim 11 wherein said solution is applied to said substrate by solution casting or by spin coating.

19. The method of claim 13 wherein said complex on said substrate is decomposed by reactive contact with a low molecular weight alcohol, or a mixture of such alcohol with a low molecular weight amine.

20. The method of claim 19 wherein said complex is decomposed by contact with methanol or ethanol, or a mixture of methanol or ethanol and triethylamine.

21. The method of claim 12 wherein said complex is the $GaCl_3$ complex containing the repeating units

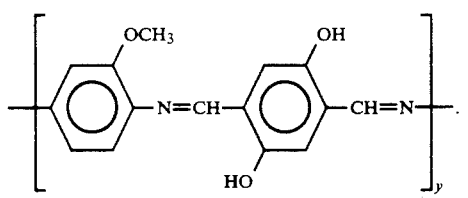

22. The method of claim 12 wherein said complex is the $GaCl_3$ complex containing the repeating units

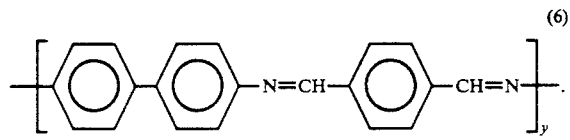

23. The method of claim 14 wherein said polyazomethine compound is comprised of the repeating units

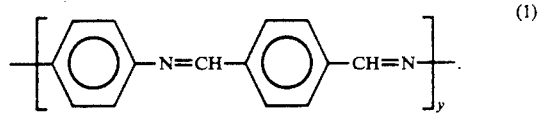

24. The method of claim 14 wherein said polyazomethine compound is comprised of the repeating units

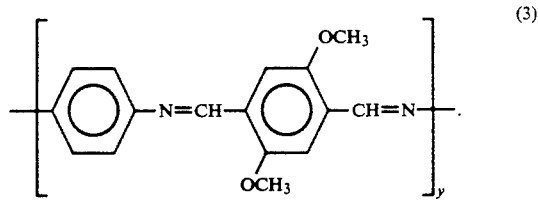

25. The method of claim 14 wherein said polyazomethine compound is comprised of the repeating units

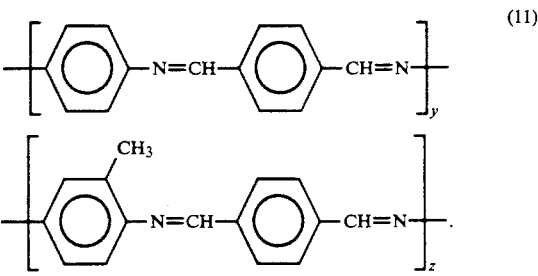

26. The method of claim 14 wherein said polyazomethine compound is comprised of the repeating units

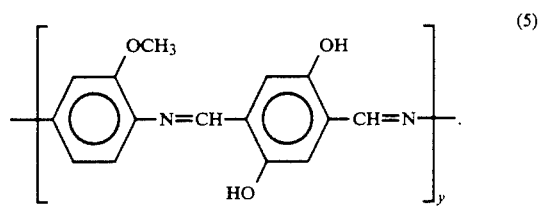

27. The method of claim 14 wherein said polyazomethine compound is comprised of the repeating units

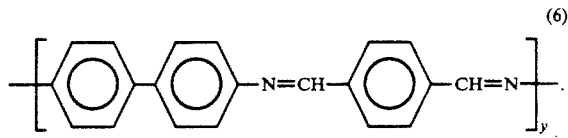

28. An optical waveguide prepared from a composition of claim 1.

29. An optical switching element prepared from a composition of claim 1.

30. A fiber prepared from a composition of claim 1.

31. A dielectric material prepared from a composition of claim 1.

* * * * *